Patented Feb. 4, 1941

2,230,576

UNITED STATES PATENT OFFICE 2,230,576

THERAPEUTIC CHAULMOOGRIC COMPOUND

Anthony J. Orlando, Brooklyn, N. Y., assignor of twenty-five per cent to Arthur B. Johnson, New Brunswick, N. J., twenty-five per cent to George Grosshans, Linden, N. J., and twenty-five per cent to Harry Katz, New Brunswick, N. J.

No Drawing. Application August 8, 1939, Serial No. 289,002

7 Claims. (Cl. 260—253)

This invention relates to therapeutic compounds, and more particularly to diuretic, bacillicidic, anti-arthritic and blood calcium retaining compounds for internal use, and to the method for producing the same.

One of the objects of the present invention is to produce a novel compound of chaulmoogric acid theobromide for internal use.

I have found that many of the double salts of the chaulmoogric series are unsuited for medicinal purposes due to unfavorable chemical or physiological action on the central nervous system, the involuntary muscles, the gastro-intestinal and genito-urinary tracts, and the respiratory centers. By properly combining certain compounds in a manner to be described hereinafter, I am able to produce stable, crystallizable products that have a constant diuretic action, act as blood calcium retainers, produce an analgesic effect, act to moderately stimulate the voluntary muscles, and have a powerful bacillicide and anti-arthritic action. My novel compounds include certain derivatives of theobromin ($C_7H_8N_4O_2$) and the fatty acids of the chaulmoogric series.

The following examples illustrate preferred methods of producing the compounds forming the subject matter of this invention.

*Example 1.*—180 grams of theobromin are dissolved in a 300 c. c. hot solution of NaOH (48 grams of NaOH). When the solution is clear, add 302 grams of sodium chaulmoograte. Continue to heat the solution until all of the sodium chaulmoograte is dissolved. Allow to cool and then evaporate until the crystal mass is dry. The resulting product contains approximately 34% of theobromin and 52.5% of chaulmoogric acid.

*Example 2.*—Add 180 grams of theobromin to 300 c. c. of a solution of absolute alcohol containing 60 grams of sodium ethylate or ethoxide. Heat this solution to 70° C. and then add 302 grams of sodium chaulmoograte. Continue to heat until a clear solution is obtained. Crystallize under vacuum or at atmospheric pressure. The resulting compound contains approximately 32.8% of theobromin and 51.3% of chaulmoogric acid.

*Example 3.*—To 300 c. c. of a hot solution of sodium hydroxide containing 23 grams of sodium hydroxide add 212.1 grams of caffeine anhydrous and 303 grams of sodium chaulmoograte, and continue to heat until a clear solution results. Cool rapidly and crystallize in air at moderate temperatures. The resulting compound contains 39.7% caffeine and 52.2% chaulmoogric acid.

I claim:

1. In a medicinal compound of the class described, theobromin in combination with chaulmoogric acid.

2. The process of producing a chaulmoogric compound with sodium hydroxide and theobromin, consisting in dissolving a predetermined quantity of theobromin of the purine group in a solution of sodium hydroxide, introducing into the resulting solution a predetermined quantity of sodium chaulmoograte, applying heat to the resulting mixture until said chaulmoograte is dissolved, removing said heat, and dehydrating the mixture in vacuo.

3. The process of producing a chaulmoogric compound with sodium hydroxide and theobromin, consisting in applying heat to a solution of sodium hydroxide and water, dissolving in said solution a predetermined quantity of theobromin of the purine group, adding thereto a predetermined quantity of sodium chaulmoograte, the application of the above heat being continued until the sodium chaulmoograte is dissolved, removing said heat and allowing the mixture to cool to a predetermined temperature, and evaporating the mixture in vacuo.

4. The process of producing a chaulmoogric acid compound which consists in introducing a predetermined quantity of theobromin into a solution of alcohol and sodium ethylate, applying heat to the resulting mixture, the latter being raised to a predetermined temperature, and adding sodium chaulmoograte to the mixture, continuing applying heat to the mixture until the latter is clear.

5. The process of producing a chaulmoogric compound with sodium hydroxide and theobromine, consisting in dissolving approximately 180 grams of theobromine in a 300 c. c. hot solution of sodium hydroxide (48 grams approximately of sodium hydroxide), introducing into the resulting solution approximately 302 grams of sodium chaulmoograte, applying heat to the resulting mixture until said chaulmoograte is dissolved, removing said heat, and dehydrating the mixture in vacuo.

6. The process of producing a chaulmoogric acid compound which consists in introducing approximately 180 grams of theobromine into a solution of 300 c. c. of absolute alcohol containing 60 grams of sodium ethylate, applying heat to the resulting mixture until the temperature is 70° C., adding approximately 302 grams of sodium chaulmoograte to the mixture, continuing applying heat to the mixture until the latter is clear, and crystallizing the mixture.

7. As a new product, the compound obtained by dissolving theobromine in a hot solution of sodium hydroxide, adding sodium chaulmoograte when the solution is clear, heating the solution until said sodium chaulmoograte is dissolved, and dehydrating the mass, the compound forming a crystalline mass and having diuretic, blood calcium retaining, bacillicidic, and anti-arthritic properties.

ANTHONY J. ORLANDO.